US012230941B2

(12) United States Patent
Kimura

(10) Patent No.: US 12,230,941 B2
(45) Date of Patent: Feb. 18, 2025

(54) SPARK PLUG

(71) Applicant: Niterra Co., Ltd., Nagoya (JP)

(72) Inventor: Junji Kimura, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 0 days.

(21) Appl. No.: 18/755,793

(22) Filed: Jun. 27, 2024

(65) Prior Publication Data

US 2025/0007249 A1 Jan. 2, 2025

(30) Foreign Application Priority Data

Jun. 30, 2023 (JP) ................................ 2023-108172

(51) Int. Cl.
*H01T 13/38* (2006.01)
*H01T 13/20* (2006.01)

(52) U.S. Cl.
CPC ............. *H01T 13/38* (2013.01); *H01T 13/20* (2013.01)

(58) Field of Classification Search
CPC ......... H01T 13/20; H01T 13/34; H01T 13/36; H01T 13/38
See application file for complete search history.

(56) References Cited

U.S. PATENT DOCUMENTS

2005/0285495 A1* 12/2005 Yoshida .................. H01T 13/38 313/143
2020/0014177 A1* 1/2020 Nakamura .............. H01T 13/38

FOREIGN PATENT DOCUMENTS

JP 2002015833 A * 1/2002 ............. H01T 13/38
JP 2009-252441 A 10/2009
JP 2020077603 A * 5/2020 ........... B23K 26/352
JP 2021093285 A * 6/2021

* cited by examiner

*Primary Examiner* — Mariceli Santiago
(74) *Attorney, Agent, or Firm* — RENNER, OTTO, BOISSELLE & SKLAR, LLP

(57) ABSTRACT

A spark plug includes a ceramic insulator, and the insulator includes a melted portion formed by melting a surface of a base material. In a cross section of the insulator, the value obtained by dividing a length of an interface between the base material and the melted portion by the length of a line segment connecting two ends of the interface is 1.1 or more and 1.5 or less.

4 Claims, 3 Drawing Sheets

SPARK PLUG

FIELD OF THE INVENTION

The present invention relates to a spark plug.

BACKGROUND OF THE INVENTION

As a technique for providing a mark on a spark plug, Japanese Unexamined Patent Application Publication No. 2009-252441 discloses a related-art technique for providing a mark on a surface of a ceramic insulator by radiating a laser beam onto the insulator instead of providing a mark on a metal shell, which is disposed over a portion of the outer periphery of the insulator.

In the related art, when the beam intensity of the laser beam is reduced, the visibility of the mark is likely to decrease, and when the beam intensity is increased, the insulator is likely to easily become broken. In the related art, there is room for improvement in terms of achieving both improvement in the visibility of the mark and reduction in the probability of breakage of the insulator.

The present invention has been made to meet this demand, and an object of the present invention is to provide a spark plug capable of both improving the visibility of a mark and reducing a probability of breakage of an insulator.

SUMMARY OF THE INVENTION

In order to achieve the object, a spark plug according to the present invention includes an insulator that is made of a ceramic, and the insulator includes a melted portion that is formed by melting a surface of a base material. In a cross section of the insulator, a value obtained by dividing a length of an interface between the base material and the melted portion by a length of a line segment connecting two ends of the interface is 1.1 or more and 1.5 or less.

According to the present invention, in the cross section of the insulator including the melted portion, which is formed by melting the surface of the base material, the value obtained by dividing the length of the interface between the base material and the melted portion by the length of the line segment connecting the two ends of the interface is 1.1 or more and 1.5 or less, and thus, improvement in the visibility of the melted portion serving as a mark and a reduction in the probability of breakage of the insulator can be both achieved.

DETAILED DESCRIPTION OF THE INVENTION

Figure 1:
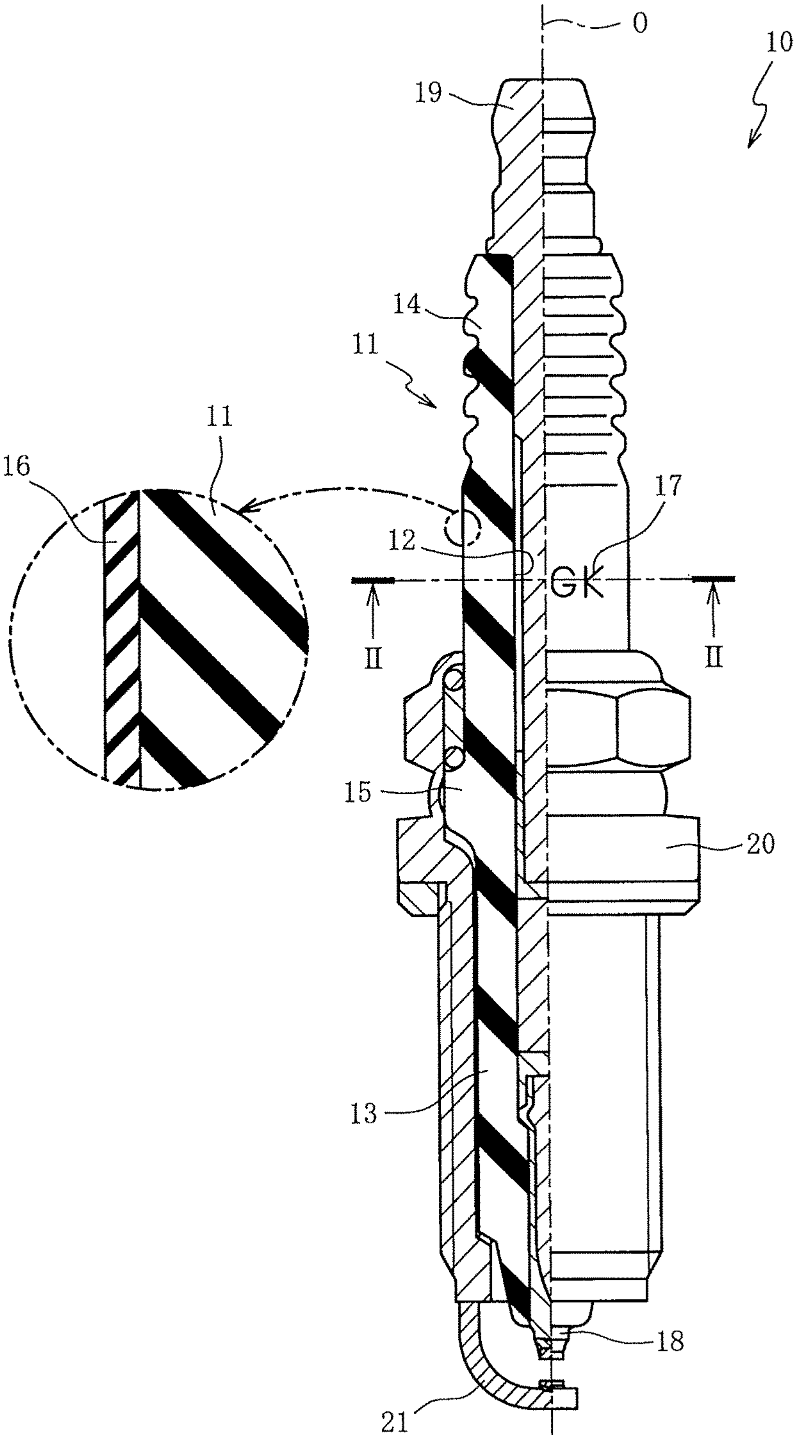
FIG. 1 is a half-sectional view of a spark plug according to a first embodiment.

Preferred embodiments of the present invention will be described below with reference to the drawings. FIG. 1 is a half-sectional view of a spark plug 10 according to the first embodiment, with an axial line O as a boundary. The lower side and the upper side as viewed in FIG. 1 will be referred to as a "front end side" of the spark plug 10 and a "rear end side" of the spark plug 10, respectively. The spark plug 10 includes an insulator 11.

The insulator 11 is a cylindrical member that has an axial hole 12 extending along the axial line O, and the insulator 11 is made of a ceramic, such as alumina, with good insulating and mechanical properties at high temperatures. The insulator 11 includes a first end portion 13 including its front end in an axial direction thereof and a second end portion 14 including its rear end in the axial direction. A projecting portion 15 that has an annular shape and projects outward in a radial direction is provided at the center of the insulator 11 in the axial direction so as to be positioned between the first end portion 13 and the second end portion 14. In the outer peripheral surface of the insulator 11, a portion that is located between the projecting portion 15 and the second end portion 14 (the rear end) and that includes the second end portion 14 is provided with a glass layer 16 and a mark 17. The surface of the glass layer 16 is resistant to contamination, and any contamination that does occur is easy to remove.

Examples of the mark 17 include a character, a figure, a number, a reference sign, a symbol, or a drawing pattern. Examples of the information indicated by the mark 17 include a producer or a seller of the spark plug 10, a country of production of the spark plug 10, a trademark relating to the spark plug 10, the type of the spark plug 10, an identification mark for an engine to which the spark plug 10 is to be attached, and a lot number or a manufacturing history of, for example, the spark plug 10 or the insulator 11. The mark 17 can include a one-dimensional code (a bar code) or a two-dimensional code. In the present embodiment, the mark 17 is the letters "NGK" that relates to a registered trademark. The mark 17 is partially illustrated in FIG. 1.

A center electrode 18 that has a rod-like shape is disposed on the front end side of the axial hole 12 of the insulator 11. In the center electrode 18, a core material having good thermal conductivity is embedded in a base material. The base material is a metal material composed of a Ni-based alloy or Ni. The core material is made of copper or a copper-based alloy. The core material can be omitted. The center electrode 18 is electrically connected to a metal terminal 19 in the axial hole 12. The metal terminal 19 is a rod-shaped member to which a high-voltage cable (not illustrated) is to be connected. The metal terminal 19 is made of a metal material (e.g., low-carbon steel) having electrical conductivity.

A metal shell 20 is a substantially cylindrical member made of a metal material (e.g., low-carbon steel) having electrical conductivity. The metal shell 20 is disposed over a portion of the outer peripheral surface of the insulator 11 and mainly surrounds a portion of the insulator 11 from the first end portion 13 to the projecting portion 15. A ground electrode 21 is a rod-shaped member that is made of a metal (e.g., a nickel-based alloy) and that is connected to the metal shell 20. A plurality of the ground electrodes 21 may be provided.

The spark plug 10 is manufactured by, for example, a method such as that described below. First, a cylindrical molded product obtained by molding ceramic powder is fired to obtain a sintered body. A glaze is applied to the outer peripheral surface of the sintered body, and then, the sintered body is fired to obtain the insulator 11 provided with the glass layer 16. The center electrode 18 is disposed in the axial hole 12 of the insulator 11 and is electrically connected to the metal terminal 19. After that, the metal shell 20 to which the ground electrode 21 is connected beforehand is assembled to the insulator 11, and a spark gap is formed between the center electrode 18 and the ground electrode 21.

A laser beam is radiated onto a portion of the insulator 11 including the second end portion 14 so as to melt the glass layer 16, which is provided on the surface of the insulator 11, and a base material 22 (see FIG. 2) that is positioned further toward the inside than the glass layer 16. The melted portion becomes the mark 17. Regarding the laser beam, a continuous wave (CW) laser or a pulsed laser is suitably selected in accordance with, for example, the type of the mark 17.

Figure 2:
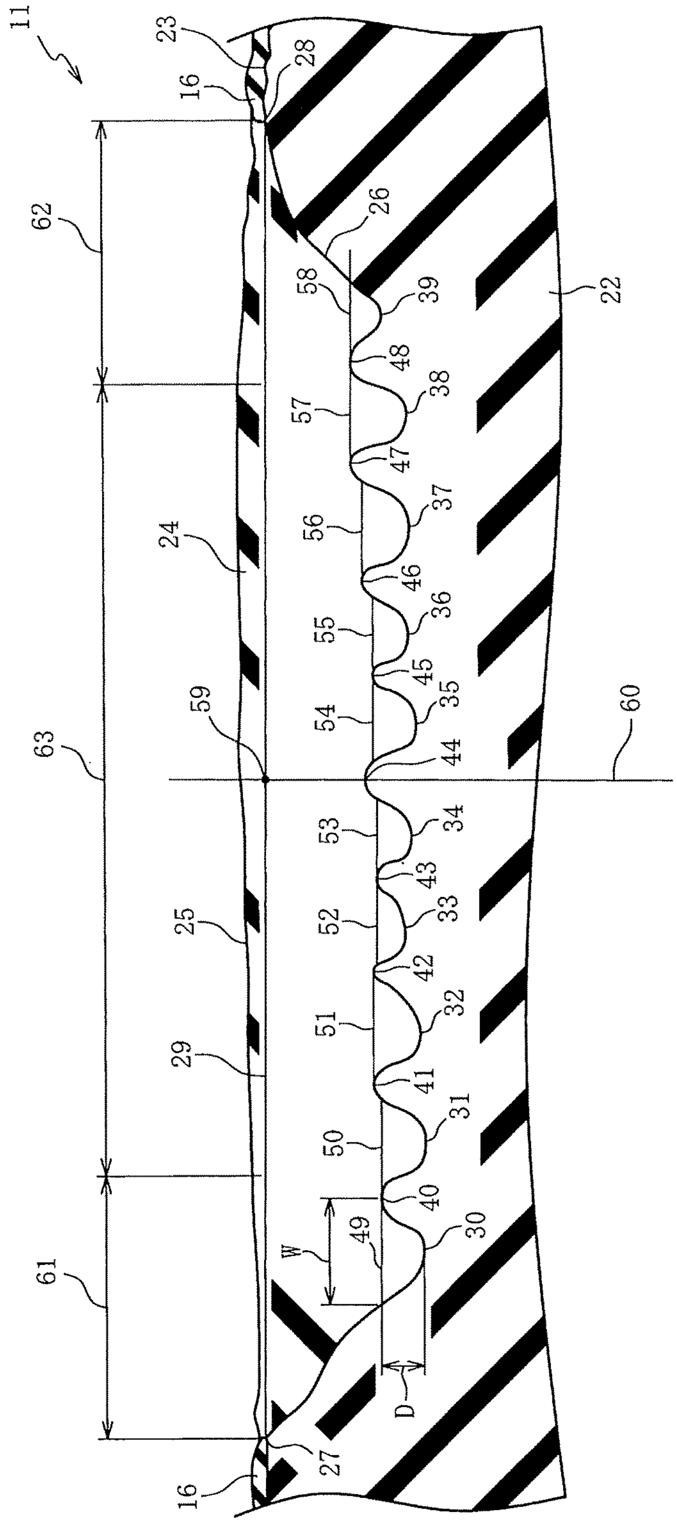
FIG. 2 is a cross-sectional view of the insulator taken along line II-II of FIG. 1.

FIG. 2 is a cross-sectional view of the insulator 11 taken along line II-II of FIG. 1. FIG. 2 illustrates, in an enlarged manner, a portion of the insulator 11 where the mark 17 (see FIG. 1) is provided in a cross section perpendicular to the axial line O. The rest of the insulator 11 excluding this portion is not illustrated in FIG. 2 (the same applies to FIG. 3). The insulator 11 includes the base material 22 formed of a sintered structure and a melted portion 24 that is formed by melting a surface 23 of the base material 22. The melted portion 24 is adjacent to the glass layer 16 provided at the surface 23 of the base material 22. The melted portion 24 is visually distinct in color from the glass layer 16 and the base material 22 and forms the mark 17.

The melted portion 24 has a surface 25 and an interface 26 between the base material 22 and the melted portion 24. The value obtained by dividing the length of the interface 26 of the melted portion 24 by the length of a line segment 29 connecting two ends 27 and 28 of the interface 26 is 1.1 or more and 1.5 or less. The two ends 27 and 28 of the interface 26 are each a point of intersection between the surface 25 of the melted portion 24 and the interface 26.

When the value obtained by dividing the length of the interface 26 of the melted portion 24 by the length of the line segment 29 is less than 1.1, the area of the melted portion 24 bonded to the base material 22 is small, and thus, the melted portion 24 is more likely to peel off from the base material 22. In addition, the distance between the surface 25 of the melted portion 24 and the interface 26 is short, and thus, the visibility of the mark 17 (the melted portion 24) is reduced. When the value obtained by dividing the length of the interface 26 of the melted portion 24 by the length of the line segment 29 exceeds 1.5, the melted portion 24 acts as a notch of the base material 22, and thus, the strength of the insulator 11 is reduced. On the other hand, when the value obtained by dividing the length of the interface 26 of the melted portion 24 by the length of the line segment 29 is 1.1 or more and 1.5 or less, the peel strength of the mark 17 (the melted portion 24), the visibility of the mark 17, and the mechanical strength of the insulator 11 can be ensured.

The interface 26 of the melted portion 24 includes a plurality of (ten in the present embodiment) protrusions 30, 31, 32, 33, 34, 35, 36, 37, 38, and 39 that protrude in a direction away from the surface 25 of the melted portion 24. The positions of the protrusions 30, 31, 32, 33, 34, 35, 36, 37, 38, and 39 each correspond to, for example, the position of a beam axis of the laser beam that is radiated onto the insulator 11 in order to form the melted portion 24.

The protrusion 30 is a portion where the interface 26 is cut off by a straight line 49 that passes through a valley 40 between the adjacent protrusions 30 and 31. The valley 40 is a point that is closest to the line segment 29 in a recessed portion between the protrusions 30 and 31. The straight line 49 is a straight line parallel to the line segment 29. A value D/W that is obtained by dividing a depth D of the protrusion 30 from the straight line 49 by a width W of the protrusion 30 (the length of a line segment cut by the protrusion 30 from the straight line 49) is 0.1 or more. A portion where the value D/W is 0.1 or more will be referred to as a protrusion. Also in the protrusions 31, 32, 33, 34, 35, 36, 37, 38, and 39, the value D/W is 0.1 or more. A portion of the interface 26 where the value D/W is less than 0.1 is not a protrusion.

The protrusion 31 is a portion where the interface 26 is cut off by a straight line 50. The straight line 50 passes through the valley 40 that is located between the adjacent protrusions 30 and 31 and that is farther from the line segment 29 than a valley 41 between the adjacent protrusions 31 and 32. The valley 41 is a point that is closest to the line segment 29 in a recessed portion between the protrusions 31 and 32. The straight line 50 is a straight line parallel to the line segment 29.

The protrusion 32 is a portion where the interface 26 is cut off by a straight line 51. The straight line 51 passes through a valley 42 that is located between the adjacent protrusions 32 and 33 and that is farther from the line segment 29 than the valley 41 between the adjacent protrusions 31 and 32. The valley 42 is a point that is closest to the line segment 29 in a recessed portion between the protrusions 32 and 33. The straight line 51 is a straight line parallel to the line segment 29.

The protrusion 33 is a portion where the interface 26 is cut off by a straight line 52. The straight line 52 passes through a valley 43 that is located between the adjacent protrusions 33 and 34 and that is farther from the line segment 29 than the valley 42 between the adjacent protrusions 32 and 33. The valley 43 is a point that is closest to the line segment 29 in a recessed portion between the protrusions 33 and 34. The straight line 52 is a straight line parallel to the line segment 29.

The protrusion 34 is a portion where the interface 26 is cut off by a straight line 53. The straight line 53 passes through the valley 43 that is located between the adjacent protrusions 33 and 34 and that is farther from the line segment 29 than a valley 44 between the adjacent protrusions 34 and 35. The valley 44 is a point that is closest to the line segment 29 in a recessed portion between the protrusions 34 and 35. The straight line 53 is a straight line parallel to the line segment 29.

The protrusion 35 is a portion where the interface 26 is cut off by a straight line 54. The straight line 54 passes through a valley 45 that is located between the adjacent protrusions 35 and 36 and that is farther from the line segment 29 than the valley 44 between the adjacent protrusions 34 and 35. The valley 45 is a point that is closest to the line segment 29 in a recessed portion between the protrusions 35 and 36. The straight line 54 is a straight line parallel to the line segment 29.

The protrusion 36 is a portion where the interface 26 is cut off by a straight line 55. The straight line 55 passes through the valley 45 that is located between the adjacent protrusions 35 and 36 and that is farther from the line segment 29 than a valley 46 between the adjacent protrusions 36 and 37. The valley 46 is a point that is closest to the line segment 29 in a recessed portion between the protrusions 36 and 37. The straight line 55 is a straight line parallel to the line segment 29.

The protrusion 37 is a portion where the interface 26 is cut off by a straight line 56. The straight line 56 passes through the valley 46 that is located between the adjacent protrusions 36 and 37 and that is farther from the line segment 29 than a valley 47 between the adjacent protrusions 37 and 38. The valley 47 is a point that is closest to the line segment 29 in a recessed portion between the protrusions 37 and 38. The straight line 56 is a straight line parallel to the line segment 29.

The protrusion 38 is a portion where the interface 26 is cut off by a straight line 57. The straight line 57 passes through a valley 48 that is located between the adjacent protrusions 38 and 39 and that is farther from the line segment 29 than the valley 47 between the adjacent protrusions 37 and 38. The valley 48 is a point that is closest to the line segment 29 in a recessed portion between the protrusions 38 and 39. The straight line 57 is a straight line parallel to the line segment 29.

The protrusion 39 is a portion where the interface 26 is cut off by a straight line 58. The straight line 58 passes through the valley 48 between the adjacent protrusions 38 and 39. The straight line 58 is a straight line parallel to the line segment 29.

When a crack starting from the end 27 of the interface 26 of the melted portion 24 propagates along the interface 26, a direction in which the crack propagates changes from a direction away from the surface 23 to a direction toward the surface 23 with a vertex of the protrusion 30 where the crack first reaches as a boundary, and thus, the propagation of the crack is hindered. The protrusions 31, 32, 33, and 34 also hinder the propagation of the crack, and thus, the probability of breakage of the interface 26 can be reduced.

Similarly, when a crack starting from the end 28 of the interface 26 propagates along the interface 26, a direction in which the crack propagates changes from a direction away from the surface 23 to a direction toward the surface 23 with a vertex of the protrusion 39 where the crack first reaches as a boundary, and thus, the propagation of the crack is hindered. The protrusions 38, 37, 36, and 35 also hinder the propagation of the crack, and thus, the probability of breakage of the interface 26 can be reduced. Since the interface 26 of the melted portion 24 includes the two or more protrusions 30, 31, 32, 33, 34, 35, 36, 37, 38, and 39, propagation of a crack along the interface 26 can be reduced, and the probability that the melted portion 24 will peel off from the base material 22 can be reduced.

The protrusions 30, 31, 32, 33, 34, 35, 36, 37, 38, and 39 are present at positions that are spaced apart from a straight line 60 passing through a midpoint 59 of the line segment 29. The straight line 60 is a straight line perpendicular to the line segment 29. The protrusions are present at the positions spaced apart from the straight line 60, and this means that there are protrusions that do not intersect the straight line 60. Since the protrusions 30, 31, 32, 33, 34, 35, 36, 37, 38, and 39 are present at the positions spaced apart from the straight line 60, when a crack propagates from the two ends 27 and 28 of the interface 26 along the interface 26, the crack reaches the protrusions 30, 31, 32, 33, 34, 35, 36, 37, 38, and 39 earlier than in the case where the protrusions intersect the straight line 60. The protrusions 30, 31, 32, 33, 34, 35, 36, 37, 38, and 39 hinder the propagation of the crack, and thus, compared to the case where there are protrusions that intersect the straight line 60, the propagation of the crack can be suppressed while the crack is still short. Therefore, the probability of breakage of the interface 26 can be further reduced.

Cracks starting from the two ends 27 and 28 of the interface 26 propagate while releasing strain energy. In the interface 26, portions 61 and 62 respectively extend from the two ends 27 and 28 of the interface 26 inward along the line segment 29 by a length that is one-fifth of the length of the line segment 29 reaches, and the other area of the interface 26 excluding the portions 61 and 62 is an area 63. When cracks starting from the two ends 27 and 28 of the interface 26 propagate beyond the portions 61 and 62, the cracks reach the area 63. In the case where a driving force of the crack propagation of a crack that has reached the area 63 is smaller than a driving force of a crack propagating through the portion 61 or 62, the propagation of the crack in the area 63 is hindered by the presence of the protrusions 32, 33, 34, 35, 36, and 37 in the area 63. Therefore, the probability that the melted portion 24 will peel off from the base material 22 can be further reduced.

The second embodiment will be described with reference to FIG. 3. In the first embodiment, the case in which the interface 26 of the melted portion 24 includes the ten protrusions has been described. In contrast, in the second embodiment, a case in which an interface 72 of a melted portion 70 includes three protrusions will be described. In the second embodiment, portions that are the same as those described in the first embodiment are denoted by the same reference signs, and the descriptions thereof will be omitted.

Figure 3:
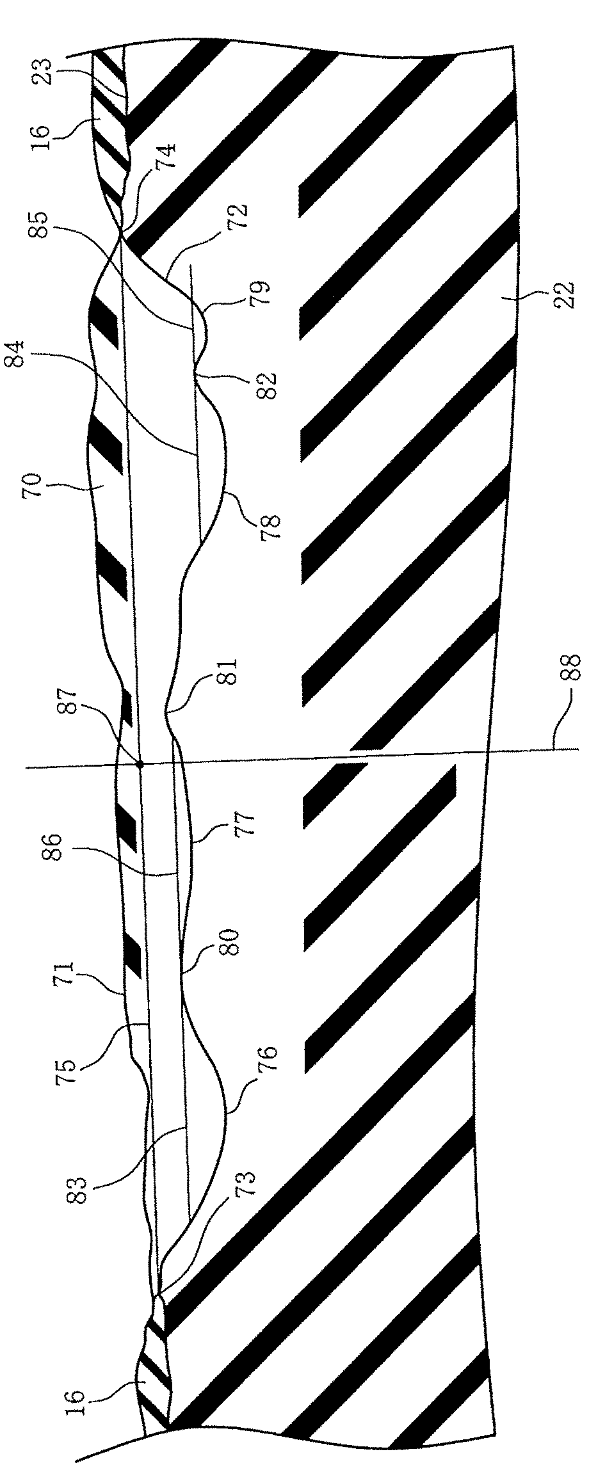
FIG. 3 is a cross-sectional view of an insulator of a spark plug according to a second embodiment.

FIG. 3 is a cross-sectional view of the insulator 11 of the spark plug 10 according to the second embodiment. The insulator 11 includes the melted portion 70 that is formed by melting the surface 23 of the base material 22. The melted portion 70 is adjacent to the glass layer 16 provided at the surface 23 of the base material 22. The melted portion 70 that is different in color from the glass layer 16 and from the base material 22 forms the mark 17.

The melted portion 70 includes a surface 71 and the interface 72 between the base material 22 and the melted portion 70. The value obtained by dividing the length of the interface 72 of the melted portion 70 by the length of a line segment 75 connecting two ends 73 and 74 of the interface 72 is 1.1 or more and 1.5 or less. Consequently, the peel strength of the mark 17 (the melted portion 70), the visibility of the mark 17, and the mechanical strength of the insulator 11 can be ensured. The two ends 73 and 74 of the interface 72 are each a point of intersection between the surface 71 of the melted portion 70 and the interface 72.

The interface 72 of the melted portion 70 includes a plurality of (three in the present embodiment) protrusions 76, 78, and 79 that protrude in a direction away from the surface 71 of the melted portion 70. The positions of the protrusions 76, 78, and 79 each correspond to, for example, the position of a beam axis of the laser beam that is radiated onto the insulator 11 in order to form the melted portion 70.

The protrusion 76 is a portion where the interface 72 is cut off by a straight line 83 passing through a valley 80 between the protrusion 76 and a raised portion 77 that is adjacent to the protrusion 76. The valley 80 is a point that is closest to the line segment 75 in a recessed portion between the protrusion 76 and the raised portion 77. The straight line 83 is a straight line parallel to the line segment 75.

The protrusion 78 is a portion where the interface 72 is cut off by a straight line 84. The straight line 84 passes through a valley 82 that is located between the adjacent protrusions 78 and 79 and that is farther from the line segment 75 than the valley 81 between the protrusion 78 and the raised portion 77, which is adjacent to the protrusion 78. The valley 82 is a point that is closest to the line segment 75 in a recessed portion between the protrusions 78 and 79. The straight line 84 is a straight line parallel to the line segment 75.

The protrusion 79 is a portion where the interface 72 is cut off by a straight line 85 that passes through the valley 82 between the adjacent protrusions 78 and 79. The straight line 85 is a straight line parallel to the line segment 75.

A distance between the valley 80, which is located between the protrusion 76 and the raised portion 77, and the line segment 75 is longer than a distance between the valley 81, which is located between the raised portion 77 and the protrusion 78, and the line segment 75. When a straight line that passes through the valley 80, which is at a longer distance from the line segment 75 than the valley 81 is, and that is parallel to the line segment 75 is a straight line 86, a value D/W that is obtained by dividing a depth D of the raised portion 77 from the straight line 86 by the length of a line segment cut by the raised portion 77 from the straight line 86 (a width W of the raised portion 77) is less than 0.1. Thus, although the raised portion 77 protrudes in the direction away from the surface 71 of the melted portion 70 in the interface 72, the raised portion 77 is not a protrusion.

When a crack starting from the end 73 of the interface 72 of the melted portion 70 propagates along the interface 72, a direction in which the crack propagates changes from a direction away from the surface 23 to a direction toward the surface 23 with a vertex of the protrusion 76 where the crack first reaches as a boundary, and thus, the propagation of the crack is hindered. Thus, the probability of breakage of the interface 72 can be reduced.

Similarly, when a crack starting from the end 74 of the interface 72 propagates along the interface 72, a direction in which the crack propagates changes from a direction away from the surface 23 to a direction toward the surface 23 with a vertex of the protrusion 79 where the crack first reaches as a boundary, and thus, the propagation of the crack is hindered. The protrusion 78 also hinders the propagation of the crack, and thus, the probability of breakage of the interface 72 can be reduced. Since the interface 72 of the melted portion 70 includes the two or more protrusions 76, 78, and 79, propagation of a crack along the interface 72 can be reduced, and the probability that the melted portion 70 will peel off from the base material 22 can be reduced.

The protrusion 76, 78, and 79 are present at positions that are spaced apart from a straight line 88 passing through a midpoint 87 of the line segment 75. The straight line 88 is a straight line perpendicular to the line segment 75. Since the protrusion 76, 78, and 79 are present at the positions spaced apart from the straight line 88, when a crack propagates from the two ends 73 and 74 of the interface 72 along the interface 72, the crack reaches the protrusion 76, 78, and 79 earlier than in the case where the protrusions intersect the straight line 88. The protrusion 76, 78, and 79 hinder the propagation of the crack, and thus, compared to the case where there are protrusions that intersect the straight line 88, the propagation of the crack can be suppressed while the crack is still short. Therefore, the probability of breakage of the interface 72 can be further reduced.

Although the present invention has been described on the basis of the embodiments, the present invention is in no way limited to the above-described embodiments, and it can be easily inferred that various improvements and modifications can be made within the scope of the present invention.

In the embodiments, although the shape of the interface 26 of the melted portion 24 and the shape of the interface 72 of the melted portion 70 in the cross section perpendicular to the axial line O of the insulator 11 have been described, the present invention is not necessarily limited thereto. Various cross sections can be employed as long as the cross section allows the interface 26 of the melted portion 24 and the interface 72 of the melted portion 70 provided in the insulator 11 to appear. Examples of the various cross sections include (1) a cross section including the axial line O, (2) a cross section parallel to the axial line O, and (3) a cross section intersecting the axial line O other than a cross section perpendicular to the axial line O.

In the embodiments, although the case has been described in which, when the spark plug 10 is attached to an engine, a tip end of the center electrode 18 and the ground electrode 21 are exposed to a combustion chamber of the engine, the present invention is not necessarily limited to this configuration. It is obvious that the present invention can be applied to insulators of other spark plugs. An example of other spark plugs is a spark plug in which a through hole is formed in a cap that covers the tip end of the center electrode 18 and the ground electrode 21 in order to provide an auxiliary combustion chamber in an engine. In addition, the present invention is not limited to a spark plug in which the spark discharge is generated between the center electrode 18 and the ground electrode 21, and it is naturally possible to apply the present invention to a spark plug in which ignition is performed by using a barrier discharge or an arc discharge.

In the first embodiment, the case in which the ten protrusions 30, 31, 32, 33, 34, 35, 36, 37, 38, and 39 are present at the positions spaced apart from the straight line 60 has been described. However, the present invention is not necessarily limited this. It is only necessary for at least one protrusion to be present at a position spaced apart from the straight line 60.

In the first embodiment, the case in which the six protrusions 32, 33, 34, 35, 36, and 37 are present in the area 63 has been described. However, the present invention is not necessarily limited this. It is only necessary for at least one protrusion to be present in the area 63.

DESCRIPTION OF REFERENCE NUMERALS

10 spark plug
11 insulator
22 base material
23 surface of base material
24 melted portion
25 surface of melted portion
26 interface
27, 28 end of interface
29 line segment
30, 31, 32, 33, 34, 35, 36, 37, 38, 39 protrusion
40, 41, 42, 43, 44, 45, 46, 47, 48 valley
49, 50, 51, 52, 53, 54, 55, 56, 57, 58 straight line
59 midpoint
60 straight line
61, 62 portion
63 area
70 melted portion
71 surface of melted portion
72 interface
73, 74 end of interface
75 line segment
76, 78, 79 protrusion
80, 82 valley
83, 84, 85 straight line
87 midpoint
88 straight line

What is claimed is:

1. A spark plug comprising:

an insulator that is made of a ceramic, wherein the insulator includes a melted portion that is formed by melting a surface of a base material, and wherein, in a cross section of the insulator, a value obtained by dividing a length of an interface between the base material and the melted portion by a length of a line segment connecting two ends of the interface is 1.1 or more and 1.5 or less.

2. The spark plug according to claim 1, wherein, in the cross section of the insulator, the interface includes two or more protrusions that protrude in a direction away from a surface of the melted portion, and wherein each of the protrusions is a portion where the interface is cut off by a straight line that is parallel to the line segment passing through a valley between the protrusions, which are adjacent to each other.

3. The spark plug according to claim 2, wherein, in the cross section of the insulator, at least one of the protrusions is present at a position spaced apart from a straight line that passes through a midpoint of the line segment and that is perpendicular to the line segment.

4. The spark plug according to claim 2, wherein, in the cross section of the insulator, at least one of the protrusions is present in an area excluding portions that respectively extend from the two ends of the interface inward along the line segment by a length that is one-fifth of the length of the line segment.

* * * * *